United States Patent
Cain et al.

(10) Patent No.: US 8,789,087 B2
(45) Date of Patent: *Jul. 22, 2014

(54) SYSTEM, DEVICE, AND METHOD FOR RECEIVER ACCESS CONTROL IN AN INTERNET TELEVISION SYSTEM

(71) Applicant: Rockstar Consortium US LP, Plano, TX (US)

(72) Inventors: Bradley Cain, Cambridge, MA (US); Thomas P. Hardjono, Winchester, MA (US)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/727,800

(22) Filed: Dec. 27, 2012

(65) Prior Publication Data

US 2013/0117776 A1 May 9, 2013

Related U.S. Application Data

(63) Continuation of application No. 09/661,273, filed on Sep. 13, 2000, now Pat. No. 8,370,507.

(51) Int. Cl.
| | |
|---|---|
| H04N 7/16 | (2011.01) |
| H04N 21/462 | (2011.01) |
| H04N 21/436 | (2011.01) |
| H04N 21/258 | (2011.01) |
| H04N 21/438 | (2011.01) |
| H04L 12/18 | (2006.01) |
| H04N 21/6405 | (2011.01) |

(52) U.S. Cl.
CPC ...... *H04N 21/25816* (2013.01); *H04N 21/4622* (2013.01); *H04N 21/43615* (2013.01); *H04N 21/4384* (2013.01); *H04L 12/185* (2013.01); *H04N 21/6405* (2013.01)
USPC .......... 725/25; 709/229; 709/225; 725/2; 725/4

(58) Field of Classification Search
CPC ............ H04N 21/25816; H04L 29/06755; G06F 21/33
USPC .................................... 725/25, 4, 2
See application file for complete search history.

(56) References Cited

U.S. PATENT DOCUMENTS

| | | | |
|---|---|---|---|
| 5,748,736 A * | 5/1998 | Mittra | 713/163 |
| 7,103,185 B1 * | 9/2006 | Srivastava et al. | 380/277 |
| 8,131,867 B1 * | 3/2012 | Luby | 709/232 |
| 8,370,507 B1 * | 2/2013 | Cain et al. | 709/229 |

* cited by examiner

*Primary Examiner* — Benjamin R Bruckart
*Assistant Examiner* — Michael M Nguyen
(74) *Attorney, Agent, or Firm* — Anderson Gorecki & Rouille LLP

(57) ABSTRACT

A system, device, and method for receiver access control in an internet television system uses a push mechanism to distribute access control information froth a distribution device to an access device. The access device uses the access control information to make receiver access control decisions for a subsequently received request from a host to join a television channel multicast group.

23 Claims, 4 Drawing Sheets

SYSTEM, DEVICE, AND METHOD FOR RECEIVER ACCESS CONTROL IN AN INTERNET TELEVISION SYSTEM

CROSS-REFERENCE OF RELATED APPLICATION

This application is a continuation of U.S. Pat. No. 8,370,507, filed on Sep. 13, 2000, titled System, Device, and Method for Receiver Access Control in an Internet Television System, which is incorporated herein by reference.

The following U.S. patents and patent applications are also incorporated by reference: Ser. No. 09/607,007 U.S. Pat. No. 8,230,010 filed Jun. 29, 2000, titled System, Device, and Method for Controlling Access in a Multicast Communication Network; U.S. Pat. No. 6,963,573 filed Sep. 13, 2000, titled System, Device, and Method for Receiver Access Control in a Multicast Communication System; and U.S. patent application Ser. No. 09/660,143, filed Aug. 17, 2005, titled System, Device, and Method for Distributing Access Control Information in a Communication System.

FIELD OF THE INVENTION

The present invention relates generally to communication systems, and more particularly to access control in an internet television system.

BACKGROUND OF THE INVENTION

In today's information age, communication networks are often used for transporting information from an information provider to one or more information consumers.

One technique for transporting information from an information provider to a group of information consumers over the communication network is known as "multicasting." Multicasting allows the information provider (referred to hereinafter as a "multicast source") to transmit a single unit of multicast information (referred to hereinafter as a "multicast packet") simultaneously to all information consumers (referred to hereinafter individually as a "multicast client" and collectively as "multicast clients") in the multicast group, specifically by addressing the multicast packet to the multicast group using a multicast address. The multicast clients monitor the communication network for multicast packets addressed to the multicast group.

In order to distribute multicast packets from a particular multicast source S to the multicast clients for a particular multicast group G, the multicast packet is routed through the communication network by a number of routers. The communication network may include multiple routing domains, and therefore the multicast packet may traverse multiple routing domains. Each router runs various routing protocols to determine, among other things, a "next hop" for each packet based upon address information in the packets. Such routing information is used to establish a multicast distribution tree (referred to hereinafter as the "shared tree"), and is maintained by each router in one or more routing tables (often referred to as a "routing information base").

One multicast application is internet television. For internet television, television channels are sent to various subscribers over an IP network using IP multicast groups. Specifically, each television channel is carried over a different multicast group, and the subscribers join the multicast groups in order to receive the television channels.

For certain types of internet television services, it is necessary to limit access to certain television channels such that only a predetermined set of authorized users can access a particular television channel. Such limited access may be used, for example, for premium (pay) channels, subscription channels, "pay per view" channels, special event channels, local blackout, or parental lockout. Unfortunately, many multicast communication networks are based upon an anonymous receiver model in which any host can join any multicast group, for example, using multicast group management protocol such as the Internet Group Management Protocol (IGMP). IGMP is described in Fenner, Internet Engineering Task Force (IETF) Request for Comments (RFC) 2236 entitled *Internet Group Management Protocol, Version* 2 (November 1997) and in Cain et al., Internet Engineering Task Force (IETF) Internet Draft draft-ietf-idmr-igmp-v3-04.txt entitled *Internet Group Management Protocol, Version* 3 (June 2000), which are hereby incorporated herein by reference in their entireties.

Furthermore, in order for the internet television service to parallel regular broadcast and cable television services, it is important for subscribers to be able to change channels quickly. Changing channels may involve leaving one multicast group and quickly joining another multicast group.

Unfortunately, typical multicast mechanisms provide neither the ability to limit access to multicast groups nor the ability to quickly switch between multicast groups that is required for internet television. Thus, an access control mechanism that provides for quick channel changes is needed.

SUMMARY OF THE INVENTION

In accordance with one aspect of the invention, a push mechanism is used to distribute access control information from a distribution device to an access device. The access device uses the access control information to make receiver access control decisions for a subsequently received request from a host to join a television channel multicast group.

One push mechanism uses a reliable multicast mechanism to distribute the access control information from the distribution device to the access device.

Another push mechanism uses a policy service to distribute the access control information in the form of policy information from the distribution device to the access device.

Yet another push mechanism uses a management mechanism to distribute the access control information in the form of management information from the distribution device to the access device.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
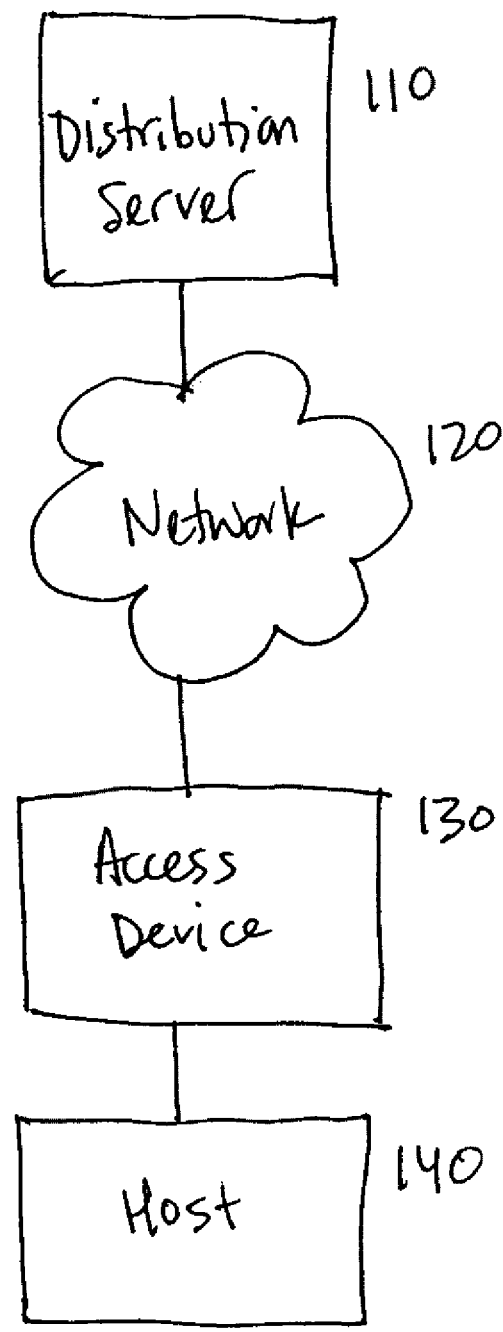
FIG. 1 is a block diagram showing an exemplary communication system in accordance with an embodiment of the present invention.

In a typical internet television system, each host accesses the internet television system through an access device. Before a host is permitted to join a television channel multicast group (i.e., the multicast group associated with the television channel), the host is authenticated to determine whether or not the host is authorized to access the television channel. This authentication can be done at a central location, at the access devices, or at various intermediate devices. If the host is authorized to access the television channel, then the host is joined to the television channel multicast group so that the host can receive the television channel.

In an embodiment of the present invention, the authentication is performed by the access control devices based upon access control information obtained from a main server. The access control information is used by an access device to determine whether a particular host is authorized to receive a particular television channel. When an access device receives a request from a host to join a particular television channel multicast group (i.e., the multicast group associated with the television channel), the access device decides whether to accept or reject the host based upon the access control information. If the access device decides to accept the host, then the access device joins the host to the television channel multicast group so that the host can receive the television channel.

In a typical prior art embodiment in which the authentication is performed at the access devices, the access device typically requests or retrieves the access control information from the main server upon receiving the request from the host to join the television channel multicast group, and then uses the access control information to authenticate the host. Because the access device does not obtain the access control information until after the request is received from the host, there may be substantial delay in authenticating the host. This in turn can cause significant delays in changing channels.

Therefore, in an embodiment of the present invention, the access control information is distributed from the main server to the access devices in such a way that the access devices receive the access control information before it is needed and without requesting or otherwise retrieving the access control information from the main server. The access devices maintain the access control information in a database for subsequent use in authenticating hosts. Because the access device obtains the access control information before the request is received from the host, there is essentially no delay in authenticating the host. This in turn reduces delays in changing channels.

Thus, by distributing the access control information in advance and performing receiver access control at the access points of the intermit television system, an embodiment of the present invention provides the access control and quick channel changing capabilities that are desirable for an internet television service.

FIG. 1 shows an exemplary communication system 100. The communication system 100 includes a distribution server 110 in communication with an access device 130 such as a router or switch over a network 120. A host device 140 accesses the network 120 via the access device 130.

The access device 130 and the host 140 typically implement a multicast group management protocol, such as the IGMP as described in Fenner, Internet Engineering Task Force (IETF) Request for Comments (RFC) 2236 entitled *Internet Group Management Protocol, Version* 2 (November 1997) and in Cain et al., Internet Engineering Task Force (IETF) Internet Draft draft-ietf-idmr-igmp-v3-04.txt entitled *Internet Group Management Protocol, Version* 3 (June 2000), which are hereby incorporated herein by reference in their entireties. Among other things, the host 140 uses the multicast group management protocol to request membership in a particular television channel multicast group. With respect to the multicast group management protocol, the access device 130 may be referred to as the Multicast Access Point (MAP) for the host 140.

The access device 130 typically implements a multicast routing protocol, such as the Protocol Independent Multicast (PIM) multicast routing protocol, in order to join the host 140 to a television channel multicast group that it is authorized to receive. PIM is a well-known protocol for routing multicast packets within a multicast routing domain. PIM is so named because it is not dependent upon any particular unicast routing protocol for setting up a multicast distribution tree within the multicast routing domain. PIM has two modes of operation, specifically a sparse mode and a dense mode. PIM Sparse Mode (PIM-SM) is described in Estrin et al., Internet Engineering Task Force (IETF) Request For Comments (RFC) 2362, *Protocol Independent Multicast—Sparse Mode (PIM-SM): Protocol Specification* (June 1998), which is hereby incorporated herein by reference in its entirety. PIM Dense Mode (PIM-DM) is described in Deering et al., Internet Engineering Task Force (IETF) Internet Draft draft-ietf-pim-v2-dm-03.txt, *Protocol Independent Multicast Version* 2 *Dense Mode Specification* (Jun. 7, 1999), which is hereby incorporated herein by reference in its entirety. Thus, the access device 130 may be a PIM Designated Router (DR) for the host device 140.

The distribution server 110 maintains the access control information in a database. The distribution server 110 may obtain the access control information in various ways. For example, the access control information may be configured at the distribution server 110 through a management interface, or the distribution server 110 may obtain the access control information from a main server (not shown) using a reliable multicast mechanism, as described in the related application 2204/A49. The present invention is in no way limited by the manner in which the distribution server 110 obtains the access control information.

In order to efficiently distribute the access control information to the access devices, the access control information is typically distributed to the access devices using a "push" mechanism by which current access control information is sent to the access devices without the access devices having to request or retrieve the access control information. The access control information may be sent by the main server at various times. For example, the access control information may be sent by the distribution server 110 periodically and/or as changes occur. The access control information typically includes a sequence number or other identifier for identifying a specific version of access control information, and is used for differentiating between different versions of access control information.

Thus, the distribution server 110 and the access device 130 implement a "push" mechanism by which the access control information is distributed from the distribution server 110 to the access device 130. Among other things, the "push" mechanism may employ unicast, multicast, or broadcast techniques. The present invention is in no way limited to any particular "push" mechanism or mechanisms.

One exemplary "push" mechanism uses reliable multicast (RM) to distribute the access control information to the access devices. Specifically, the distribution server 110 and all access devices support the reliable multicast mechanism. All access devices, including the access device 130, join a dedicated multicast group. The distribution server 110 obtains access control information, for example, through a management interface, and sends the access control information to the access devices using a multicast group address associated with the multicast group according to the reliable multicast mechanism. Each access device, including the access device 130, recovers the access control information using the reliable multicast mechanism and stores the access control information in a database for later use in making receiver access control decisions.

Another exemplary "push" mechanism uses a policy service, such as the Common Open Policy Service (COPS), to distribute the access control information in the form of policy information to the access devices. COPS is described in the Internet Engineering Task Force (IETF) Request for Comments (RFC) 2748 entitled *The COPS (Common Open Policy Service) Protocol* (January 2000), which is hereby incorporated herein by reference in its entirety. In order to distribute the access control information using the policy service, a policy service connection is typically established from the distribution server 110 to the access device 130 over the network 120, and the access control information is sent in the form of policy information from the distribution server 110 to the access device 130 over the policy service connection.

With respect to the policy service, the device at which policy decisions are made is commonly referred to as the Policy Decision Point (PDP), and the device at which the policy decisions are enforced is commonly referred to as the Policy Enforcement Point (PEP).

In a typical policy service application, as described in the related application 2204/A48, the distribution server 110 makes the policy decisions and the access device 130 enforces the policy decisions. Therefore, the distribution server 110 is typically the PDP while the access device 130 is typically the PEP.

In an embodiment of the present invention, however, the access device 130 makes and enforces the policy decisions. Specifically, the access device 130 obtains the access control information from the distribution server 110, maintains the access control information in a database, uses the access control information to determine whether the host 140 is authorized to join the television channel multicast group, and either admits the host 140 to the television channel multicast group, if the host 140 is authorized to join the television channel multicast group, or rejects the host 140, if the host 140 is not authorized to join the television channel multicast group. Therefore, the access device 130 is both the PDP and the PEP.

Yet another exemplary "push" mechanism uses a management mechanism, such as the Simple Network Management Protocol (SNMP) or Command Line Interface (CLI), to distribute the access control information in the form of management information to the access devices. The management mechanism provides a management path between the distribution device 110 and the access device 130 over which the distribution device 110 forwards access control information to the access device 130.

Figure 2:
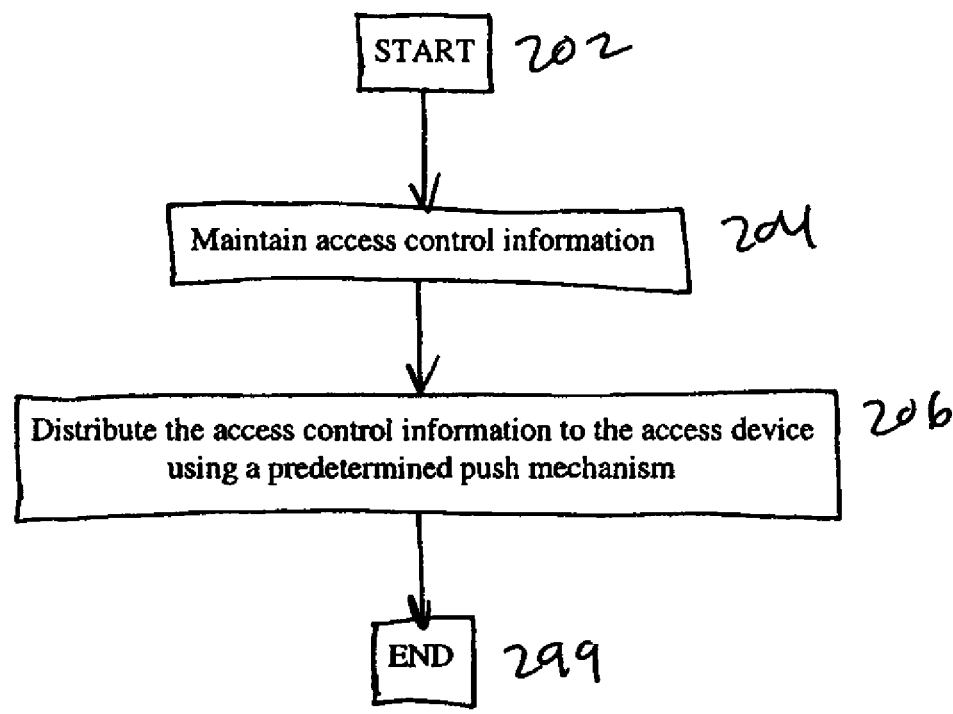
FIG. 2 is a logic flow diagram showing exemplary distribution device logic for distributing access control information to an access device using a push mechanism in accordance with an embodiment of the present invention.

FIG. 2 shows exemplary distribution device logic 200 for distributing access control information to the access devices using a push mechanism. Beginning in block 202, the logic maintains access control information, in block 204, and distributes the access control information to the access device using a predetermined push mechanism, in block 206. The logic may distribute access control information at various times, for example, periodically and/or when changes occur. The logic 200 terminates in block 299.

Figure 3:
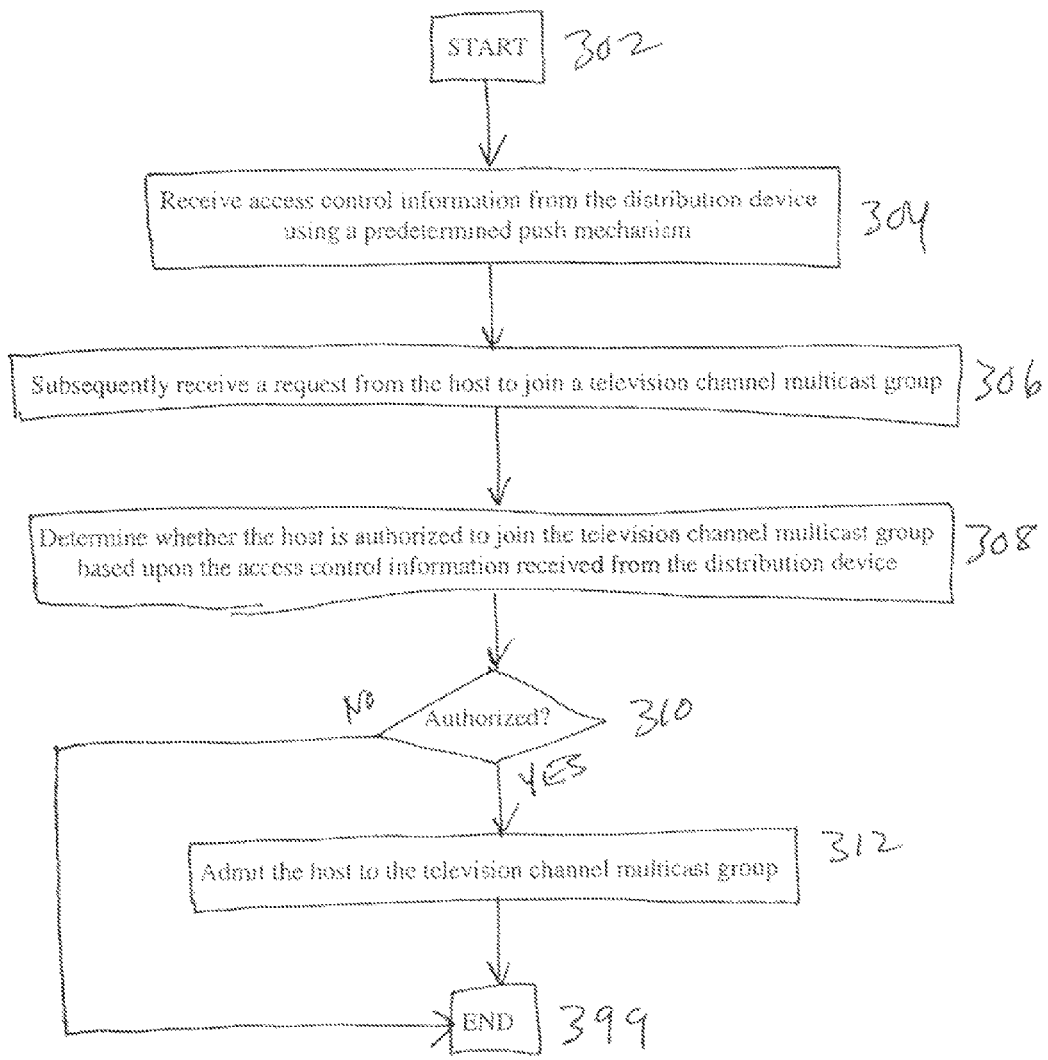
FIG. 3 is a logic flow diagram showing exemplary access device logic for providing receiver access control using access control information received from a distribution device using a push mechanism in accordance with an embodiment of the present invention.

FIG. 3 shows exemplary access device logic 300 for providing receiver access control using access control information received from the distribution device using a push mechanism. Beginning in block 302, the logic receives the access control information from the distribution device using a predetermined push mechanism, in block 304, and typically stores the access control information in a database. The logic subsequently receives a request from the host to join a television channel multicast group, in block 306. Upon receiving the request from the host to join the television channel multicast group, in block 306, the logic determines whether the host is authorized to join the television channel multicast group based upon the access control information received from the distribution device, in block 308. If the host is authorized to join the television channel multicast group (YES in block 310), then the logic admits the host to the television channel multicast group, in block 312. If the host is not authorized to join the television channel multicast group (NO in block 310), then the logic rejects the host. The logic 300 terminates in block 399.

Figure 4:
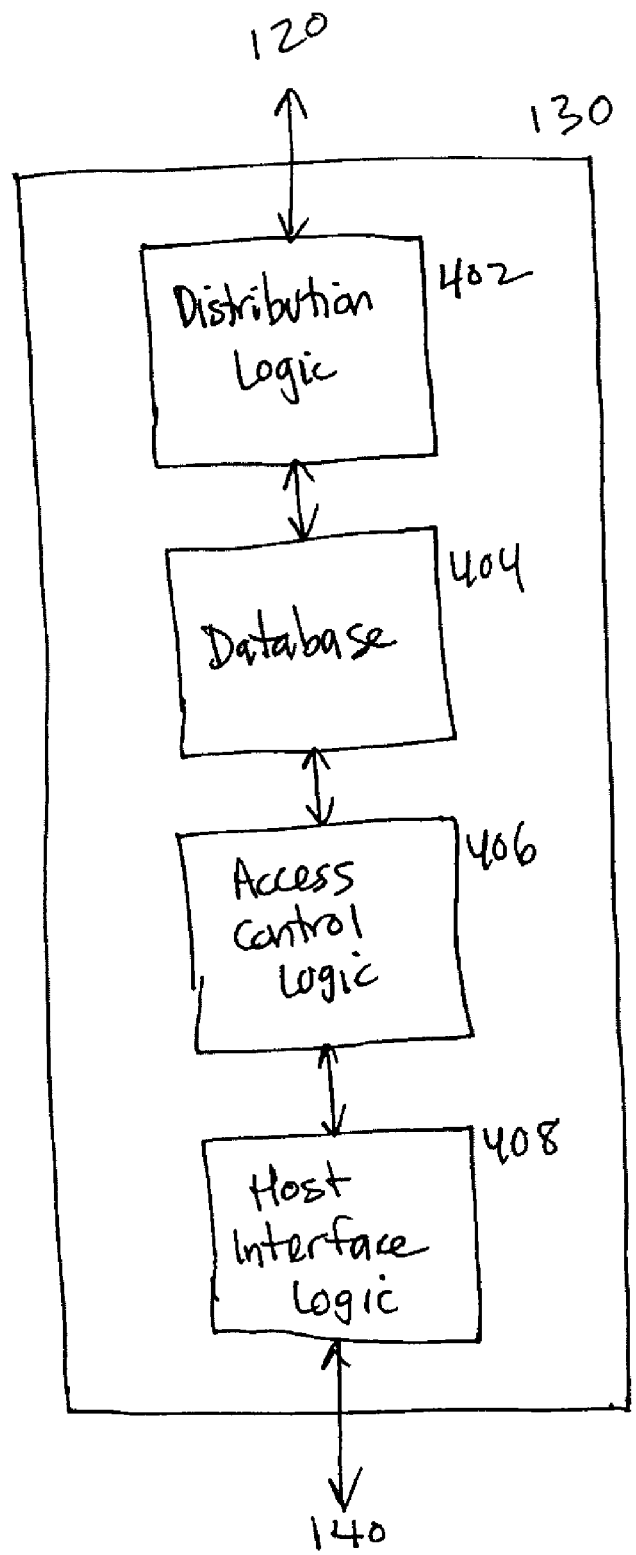
FIG. 4 is a block diagram showing the relevant logic blocks of an exemplary access device in accordance with an embodiment of the present invention.

FIG. 4 shows the relevant logic blocks of an exemplary access device 130. Among other things, the access device 130 includes distribution logic 402, database 404, access control logic 406, and host interface logic 408. The distribution logic 402 uses a predetermined push mechanism to obtain access control information from the distribution device 110, and stores the access control information in the database 404. The host interface logic 408 implements a multicast group management protocol, such as IGMP, for receiving a request from the host device 140 to join a television channel multicast group. When the host interface logic 408 receives a request from the host device 140 to join a television channel multicast group, the access control logic 406 retrieves access control information from the database 404 and uses the access control information to determine whether the host device 140 is authorized to join the television channel multicast group. If the host device 140 is authorized to join the television channel multicast group, then the access control logic 406 admits the host device 140 to the television channel multicast group. Admitting the host device 140 to the television channel multicast group may involve joining the television channel multicast group by the access control logic 406 and adding the host device 140 to an outgoing list in a forwarding table for forwarding television channel multicast data to the host device 140. If the host device 140 is not authorized to join the television channel multicast group, then the access control logic 406 rejects the host device 140.

It should be noted that the present invention is in no was limited to any particular push mechanism. The present invention can be embodied using any mechanism by which access control information is pushed to the access devices for making receiver access control decisions for a subsequently received request from a host to join a television channel multicast group.

It should be noted that terms such as "router" and "server" are used herein to describe various communication devices that may be used in a communication system, and should not be construed to limit the present invention to any particular communication device type. Thus, a communication device may include, without limitation, a bridge, router, bridge-router (brouter), switch, node, server, or other communication device.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the distribution device logic and access device logic is implemented as a set of computer program instructions that is converted into a computer executable form, stored as such in a computer readable medium, and executed by a microprocessor within the distribution device 110 and the access device 130, respectively, under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What we claim is:

1. An access control method for a multicast data service in which host devices request access to respective multicast groups to access corresponding streams of multicast packets, the access control method comprising:
   distributing multicast group access control information from a distribution device to at least one access device for use by the at least one access device in authenticating subsequent requests by individual host devices to join multicast groups to access respective multicast data streams, each access device being connected between the distribution device and at least one respective host device;
   receiving, by an access device, a subsequent request by one of the host devices to join a multicast group in order to access a respective stream of multicast packets;
   determining, by the access device, whether the host device is authorized to join the multicast group based on the access control information distributed from the distribution device; and
   admitting, by the access device, the host device to the multicast group if and only if the host device is determined to be authorized to join the multicast group.

2. The method of claim 1, comprising storing, by the at least one access device, at least some of the multicast group access control information distributed from the distribution device.

3. The method of claim 1, wherein distributing the access control information from the distribution device to at least one access device comprises sending the access control information over at least one policy service connection established between the distribution device and the at least one access device.

4. The method of claim 1, wherein distributing the access control information from the distribution device to the at least one access device comprises pushing the access control information from the distribution device to the at least one access control device using a predetermined push mechanism.

5. The method of claim 4, wherein the predetermined push mechanism comprises a reliable multicast mechanism.

6. The method of claim 4, wherein the predetermined push mechanism comprises:

the access devices joining a predetermined multicast group;

the distribution device sending the access control information to the predetermined multicast group using a reliable multicast mechanism; and the access devices in the multicast group receiving the access control information using the reliable multicast mechanism.

7. The method of claim 4, wherein the predetermined push mechanism comprises a policy service.

8. The method of claim 7, wherein the policy service comprises Common Open Policy Service (COPS).

9. The method of claim 7, wherein pushing the access control information from the distribution device to the at least one access control device using a predetermined push mechanism comprises sending the access control information from the distribution device to the at least one access control device in the form of policy information using the policy service.

10. The method of claim 4, wherein the predetermined push mechanism comprises a management mechanism.

11. The method of claim 10, wherein the management mechanism comprises a Simple Network Management Protocol (SNMP).

12. The method of claim 10, wherein the management mechanism comprises a Command Line Interface (CLI).

13. The method of claim 10, wherein pushing the access control information to the at least one access control device using a predetermined push mechanism comprises sending the access control information from the distribution device to the at least one access device in the form of management information using the management mechanism.

14. The method of claim 1, wherein distributing the access control information from the distribution device to the at least one access device occurs at a periodic interval.

15. The method of claim 1, wherein distributing the access control information from the distribution device to the at least one access device occurs when there is a change in the access control information.

16. The method of claim 1, wherein receiving, by one of the access devices, a subsequent request by one of the host devices to join a multicast group comprises receiving a multicast group management protocol request.

17. The method of claim 16, wherein the multicast group management protocol request is an Internet Group Management Protocol (IGMP) request.

18. The method of claim 1, wherein determining whether the host device is authorized to join the multicast group comprises authenticating the host device based on the access control information.

19. The method of claim 1, wherein admitting the host device to the multicast group comprises the access device joining the multicast group using a predetermined multicast routing protocol.

20. The method of claim 19, wherein the predetermined multicast routing protocol comprises a Protocol Independent Multicast (PIM) multicast routing protocol.

21. The method of claim 1, wherein admitting the host device to the multicast group comprises the access device adding the host device to an outgoing list in a forwarding table.

22. The method of claim 1, wherein at least some of the multicast groups comprise video channels.

23. The method of claim 1, wherein at least some of the multicast groups comprise television channels.

* * * * *